(12) United States Patent
Fujita et al.

(10) Patent No.: US 9,371,853 B2
(45) Date of Patent: Jun. 21, 2016

(54) JET PUMP AND BOLT FIXING DEVICE OF JET PUMP BEAM

(71) Applicant: KABUSHIKI KAISHA TOSHIBA, Minato-ku (JP)

(72) Inventors: Tomoki Fujita, Yokohama (JP); Yuichi Motora, Minato-ku (JP); Kiyofumi Saiki, Yokohama (JP); Kunihiko Kinugasa, Yokohama (JP); Yasuhiro Sakai, Zama (JP); Haruhiko Hata, Kawasaki (JP); Hajime Mori, Yokohama (JP); Yuki Minato, Shinagawa-ku (JP); Akira Ito, Amagasaki (JP); Kozue Matsukawa, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 94 days.

(21) Appl. No.: 14/363,709

(22) PCT Filed: Dec. 19, 2012

(86) PCT No.: PCT/JP2012/008106
§ 371 (c)(1),
(2) Date: Jun. 6, 2014

(87) PCT Pub. No.: WO2013/094191
PCT Pub. Date: Jun. 27, 2013

(65) Prior Publication Data
US 2014/0321937 A1    Oct. 30, 2014

(30) Foreign Application Priority Data

Dec. 22, 2011    (JP) ................. 2011-280714

(51) Int. Cl.
*F16B 39/24* (2006.01)
*F16B 39/10* (2006.01)
(Continued)

(52) U.S. Cl.
CPC . *F16B 39/10* (2013.01); *F04F 5/44* (2013.01); *F16B 37/14* (2013.01); *G21C 15/25* (2013.01); *G21C 19/02* (2013.01); *G21C 19/20* (2013.01); *F16B 39/282* (2013.01); *Y02E 30/40* (2013.01)

(58) Field of Classification Search
CPC ...................................................... F16B 39/24
USPC ........................................ 411/132, 133, 145
See application file for complete search history.

(56) References Cited

U.S. PATENT DOCUMENTS

| 5,515,407 A | 5/1996 | Bevilacqua et al. |
| 6,434,208 B1 | 8/2002 | Erbes et al. |

(Continued)

FOREIGN PATENT DOCUMENTS

| EP | 2 383 355 A1 | 11/2011 |
| JP | 2002-277583 A | 9/2002 |

(Continued)

OTHER PUBLICATIONS

Extended European Search Report issued on Aug. 4, 2015 in European Patent Application No. 12860452.7.

(Continued)

*Primary Examiner* — Roberta Delisle
(74) *Attorney, Agent, or Firm* — Oblon, McClelland, Maier & Neustadt, L.L.P.

(57) ABSTRACT

A bolt fixing device is configured so that a lock cap is pushed up by elastic force of an elastic member and engages upper surface teeth with lower surface teeth, the upper surface teeth being formed on the upper surface of a flange of a lock cap, the lower surface teeth being formed on the lower surface of an engagement flange of a body housing. Thus, the head bolt of a jet pump beam is fixed. With the configuration, when installing an inlet mixer, the head bolt of the jet pump beam is simply and reliably locked against rotation.

6 Claims, 14 Drawing Sheets

(51) Int. Cl.
  *G21C 15/25* (2006.01)
  *G21C 19/02* (2006.01)
  *G21C 19/20* (2006.01)
  *F04F 5/44* (2006.01)
  *F16B 37/14* (2006.01)
  *F16B 39/282* (2006.01)

(56) References Cited

U.S. PATENT DOCUMENTS

| | | | |
|---|---|---|---|
| 6,726,395 B2 | 4/2004 | Yu | |
| 8,879,683 B2 * | 11/2014 | Katayama | C22C 19/055 376/372 |
| 9,076,560 B2 * | 7/2015 | Mori | G21C 15/25 |
| 2010/0002826 A1 | 1/2010 | Mori et al. | |
| 2012/0307958 A1 * | 12/2012 | Mori | G21C 15/25 376/407 |

FOREIGN PATENT DOCUMENTS

| | | |
|---|---|---|
| JP | 2003-120643 A | 4/2003 |
| JP | 2010-014674 A | 1/2010 |

OTHER PUBLICATIONS

Office Action and Search Report issued on Oct. 27, 2014 in the corresponding Taiwanese Patent Application No. 101148980 (with Translation of Category of Cited Documents).

International Search Report issued Feb. 5, 2013, in PCT/JP12/008106 filed Dec. 19, 2012.

* cited by examiner

LOOSENING DIRECTION ←——————→ TIGHTENING DIRECTION

LOOSENING DIRECTION ←→ TIGHTENING DIRECTION (a)

TIGHTENING DIRECTION OF HEAD BOLT (b) TIGHTENING DIRECTION OF HEAD BOLT (c) TIGHTENING DIRECTION OF HEAD BOLT (d)

LOOSENING DIRECTION OF HEAD BOLT

JET PUMP AND BOLT FIXING DEVICE OF JET PUMP BEAM

TECHNICAL FIELD

Embodiments of the present invention relate to a jet pump installed in a downcomer portion of a reactor pressure vessel of a boiling water reactor, and a bolt fixing device of a jet pump beam.

BACKGROUND ART

A boiling water reactor is typically equipped with an external circulation system for forcefully feeding coolant into a reactor core. A plurality of sets of jet pumps connected to the external circulation system are arranged in an annular downcomer portion between a core shroud and a reactor pressure vessel.

A jet pump mainly includes a riser, a diffuser, and an inlet mixer. To install the jet pump in the reactor pressure vessel, the riser, the diffuser, and the inlet mixer are installed in such order. The diffuser is welded and mounted onto a baffle plate in the reactor pressure vessel.

The inlet mixer is installed by passing a lower end of the inlet mixer through a riser bracket attached to a side surface of the riser pipe, and then inserting the lower end into an opening in the top of the diffuser. A seat surface of an elbow part of the inlet mixer is placed on the top of the riser. A head bolt of a jet pump beam for installing the inlet mixer is then tightened to fix the inlet mixer to the upper portion of the riser.

After the head bolt is tightened to install the inlet mixer on the top of the riser via the jet pump beam, the head bolt threadedly coupled with the jet pump beam needs to be locked against rotation.

Among conventional bolt fixing devices for a jet pump beam there is a technique, for example, described in Patent Document 1. The technique includes providing an axially-slidable, integrally-rotating lock cap on a polygonal head portion of the head bolt, and arranging a body housing accommodating the lock cap on an upper surface of the jet pump beam. A plurality of tapered external teeth are formed on an outer peripheral side surface of the lock cap. The body housing has internal tooth-like grooves to selectively mesh with the external teeth of the lock cap. The external teeth of the lock cap and the internal tooth-like grooves are meshed with each other, whereby the head bolt of the jet pump beam is fixed.

PRIOR ART DOCUMENTS

Patent Documents

Patent Document 1: Japanese Patent Application Laid-Open Publication No. 2010-14674

SUMMARY OF THE INVENTION

Problems to be Solved by the Invention

According to the technique described in Patent Document 1, the lock cap needs to be moved upward to mesh the external teeth with the internal tooth-like grooves of the body housing. The meshing may be difficult unless the dimensions of the external teeth of the lock cap and the internal tooth-like grooves of the body housing are accurately set. Since the dimensions of the external teeth of the lock cap and the internal tooth-like grooves of the body housing need to be accurately set, the external teeth of the lock cap and the internal tooth-like grooves of the body housing both need precise machining.

An object of embodiments of the present invention is to provide a jet pump and a bolt fixing device of a jet pump beam by which a head bolt of the jet pump beam can be easily and reliably locked against rotation when installing an inlet mixer.

Means for Solving the Problem

In order to achieve the above-mentioned object, according to an embodiment, there is provided a bolt fixing device of a jet pump beam for fixing a head bolt of a jet pump beam pressing an inlet mixer from vertically above, the inlet mixer being arranged on an upper portion of a riser of a jet pump of a boiling water reactor and forming a reversing channel of cooling water, the bolt fixing device of a jet pump beam comprising: a lock cap that fits to a polygonal head portion of the head bolt, is movable in a vertical axis direction, and is integrally rotatable with the head bolt; a body housing that accommodates the lock cap and is arranged on an upper surface of the jet pump beam; and an elastic member that is arranged in the body housing below the lock cap and applies vertically upward elastic force to the lock cap, the lock cap being pushed up by the elastic force of the elastic member so that a plurality of upper surface teeth circumferentially formed on an upper surface of a flange of the lock cap mesh with a plurality of lower surface teeth circumferentially formed on a lower surface of a locking flange of the body housing, whereby the head bolt of the jet pump beam is fixed.

Furthermore in order to achieve the above-mentioned object, according to an embodiment, there is provided a bolt fixing device of a jet pump beam for fixing a head bolt of a jet pump beam pressing an inlet mixer from vertically above, the inlet mixer being arranged on an upper portion of a riser of a jet pump of a boiling water reactor and forming a reversing channel of cooling water, the bolt fixing device of a jet pump beam comprising: a lock cap that fits to a polygonal head portion of the head bolt, is movable in a vertical axial direction, and is integrally rotatable with the head bolt; a body housing that accommodates the lock cap and is arranged on an upper surface of the jet pump beam; and an elastic member that is arranged in the body housing below the lock cap and applies vertically upward elastic force to the lock cap, the lock cap being pushed up by the elastic force of the elastic member so that an engaging portion circumferentially formed on an upper surface of a flange of the lock cap is engaged with a to-be-engaged portion circumferentially formed on a lower surface of a locking flange of the body housing, whereby the head bolt of the jet pump beam is fixed.

Furthermore in order to achieve the above-mentioned object, according to an embodiment, there is provided a jet pump of a boiling water reactor including a bolt fixing device of a jet pump beam for fixing a head bolt of a jet pump beam pressing an inlet mixer from vertically above, the inlet mixer being arranged on an upper portion of a riser and forming a reversing channel of cooling water, the bolt fixing device of a jet pump beam comprising: a lock cap that fits to a polygonal head portion of the head bolt, is movable in a vertical axial direction, and is integrally rotatable with the head bolt; a body housing that accommodates the lock cap and is arranged on an upper surface of the jet pump beam; and an elastic member that is arranged in the body housing below the lock cap and applies vertically upward elastic force to the lock cap, the lock cap being pushed up by the elastic force of the elastic member so that a plurality of upper surface teeth circumferentially formed on an upper surface of a flange of the lock cap mesh with a plurality of lower surface teeth circumferentially formed on a lower surface of a locking flange of the body housing, whereby the head bolt of the jet pump beam is fixed.

Advantage of the Invention

According to the embodiments of the present invention, the bolt of the jet pump beam can be easily and reliably locked against rotation when installing the inlet mixer.

BRIEF DESCRIPTION OF THE DRAWINGS

FIG. 15 is an elevational sectional view showing a state where the lock cap of FIG. 6 is pushed in.

EMBODIMENTS FOR CARRYING OUT THE INVENTION

Embodiments of the bolt fixing device of a jet pump beam according to the present invention will be described below with reference to the drawings.

First Embodiment (Configuration)

A configuration of a reactor pressure vessel and a jet pump will initially be described.

Figure 1:
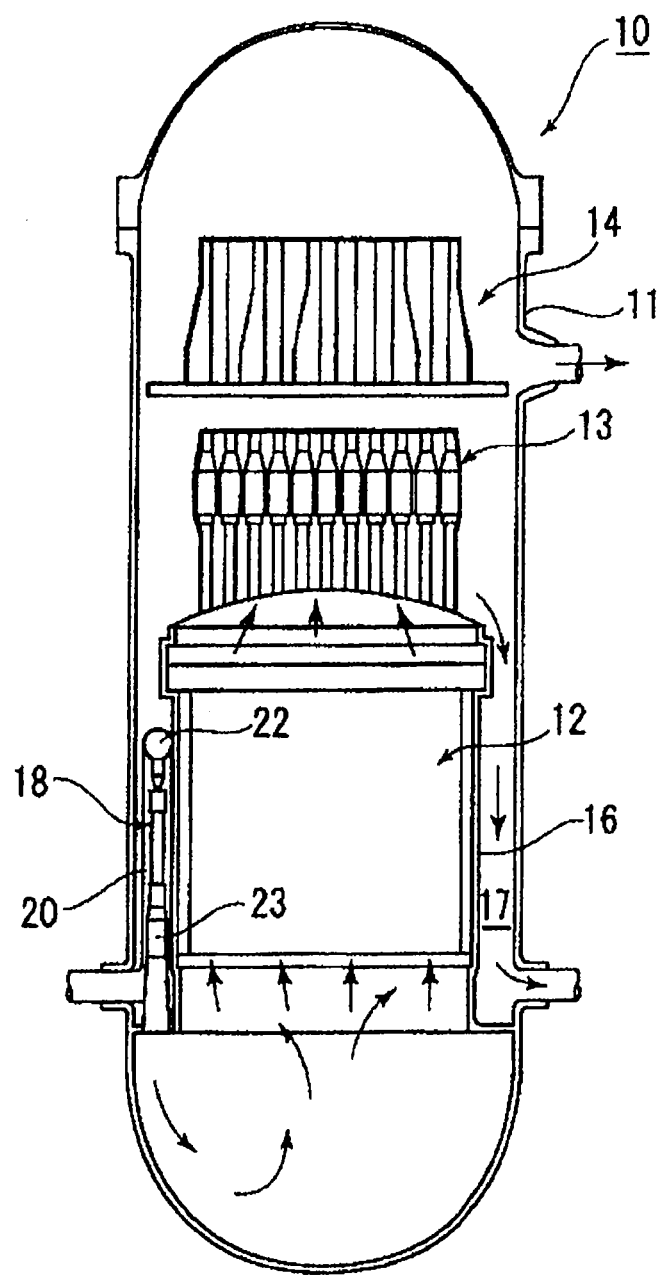
FIG. 1 is an elevational sectional configuration diagram showing an overview of a reactor pressure vessel of a boiling water reactor to which the present invention is applied.
Figure 2:
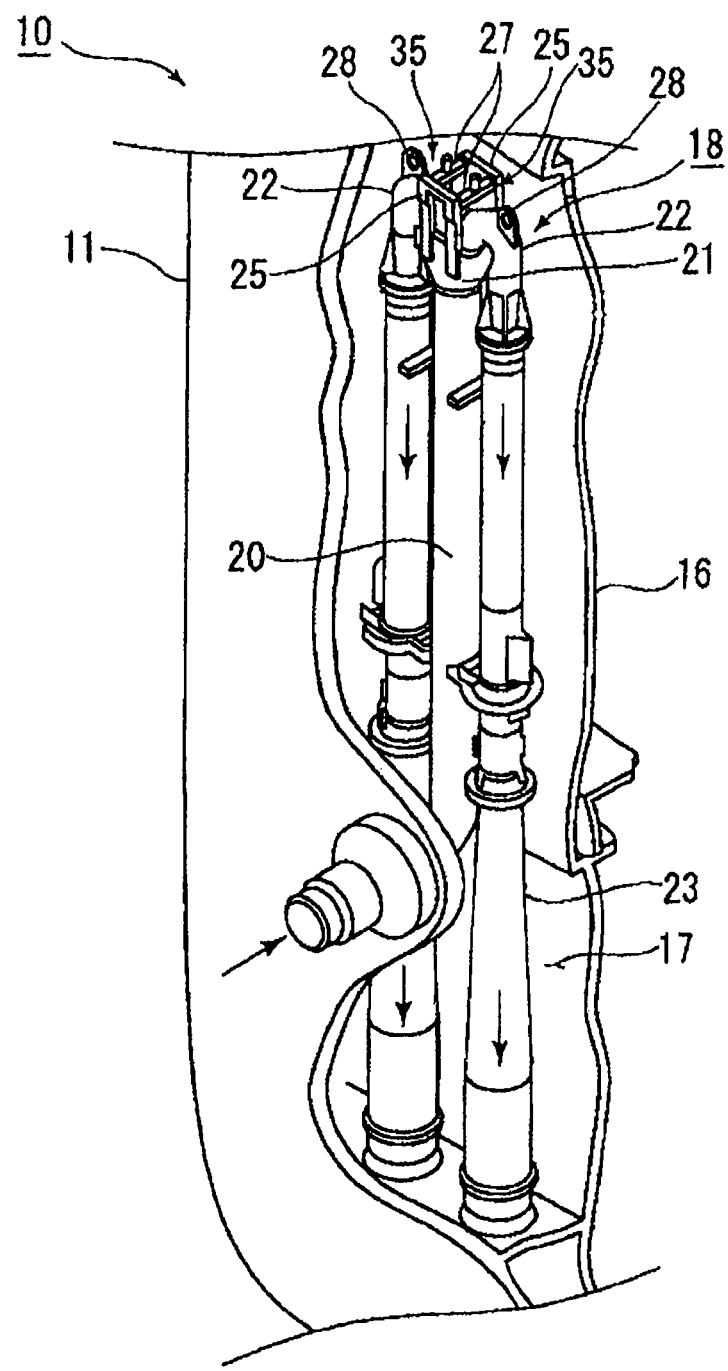
FIG. 2 is a perspective view showing a jet pump installed in a downcomer portion in the reactor pressure vessel of FIG. 1.
Figure 3:
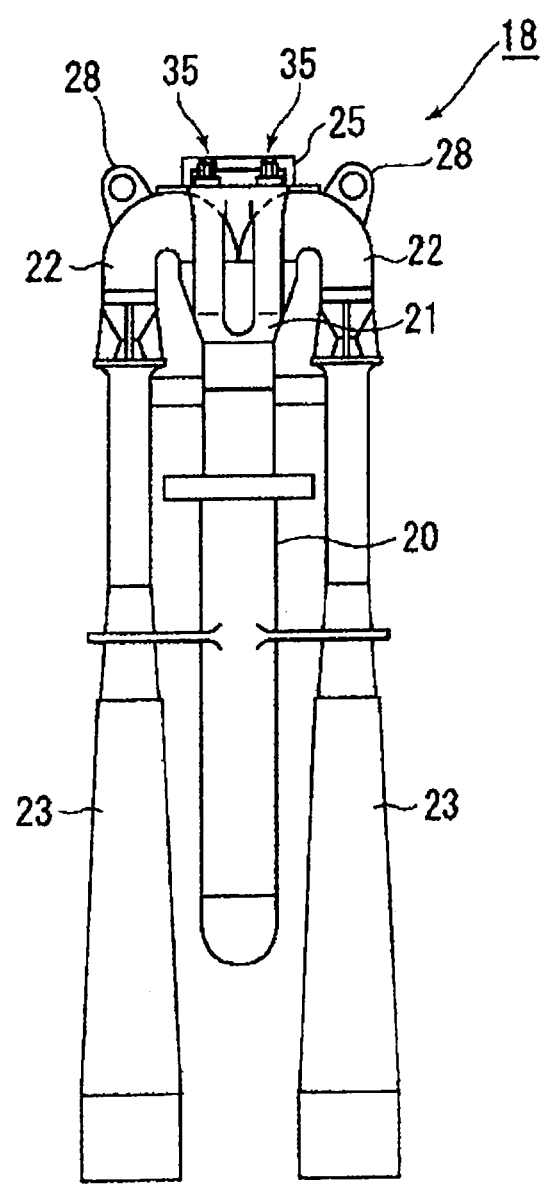
FIG. 3 is an elevational view showing the jet pump of FIG. 2.
Figure 4:
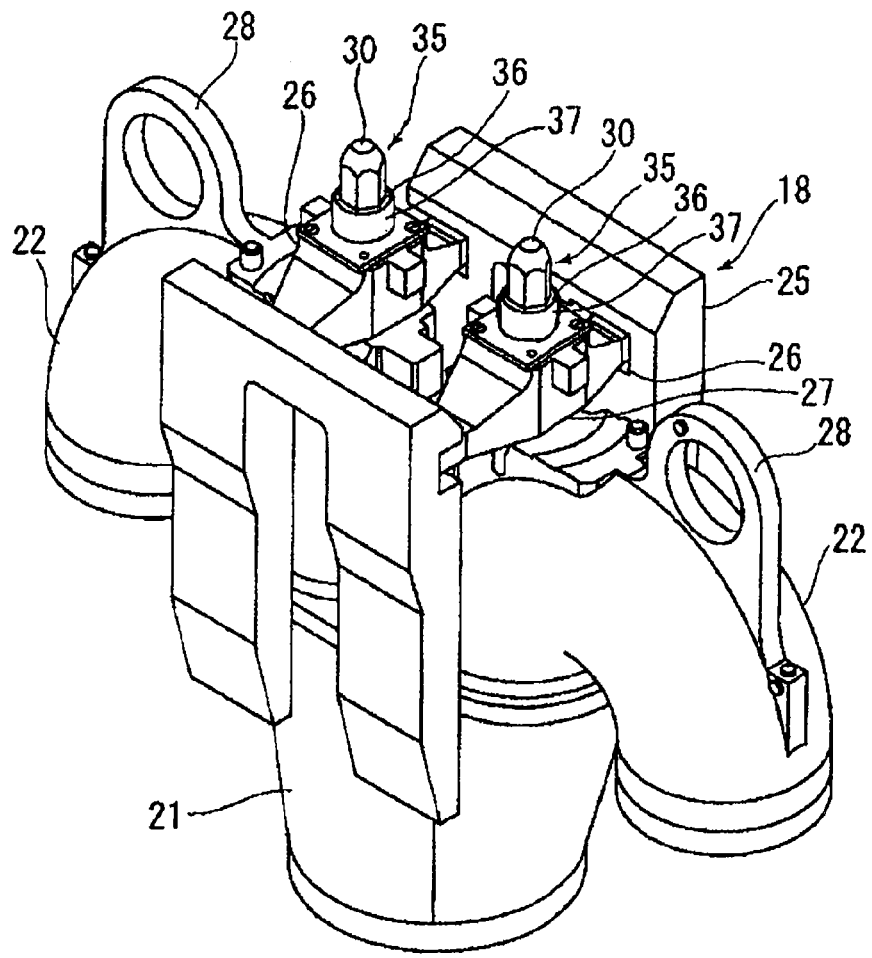
FIG. 4 is an enlarged perspective view showing an upper portion of the jet pump of FIG. 3.

FIG. 1 is an elevational sectional configuration diagram showing a general configuration of a reactor pressure vessel of a boiling water reactor to which the present invention is applied. FIG. 2 is a perspective view showing a jet pump installed in a downcomer portion in the reactor pressure vessel of FIG. 1. FIG. 3 is an elevational view showing the jet pump of FIG. 2. FIG. 4 is an enlarged perspective view showing an upper portion of the jet pump of FIG. 3.

As shown in FIG. 1, a boiling water reactor 10 includes a reactor core 12 which is accommodated in a reactor pressure vessel 11. Steam liquid separators 13 and steam dryers 14 are installed in such order above the reactor core 12.

The reactor core 12 is surrounded by a cylindrical core shroud 16. An annular downcomer portion 17 is formed between the core shroud 16 and the reactor pressure vessel 11. The downcomer portion 17 includes a plurality of sets, e.g., ten sets of, twenty jet pumps 18. The jet pumps 18 are connected to an external reactor recirculation system (not shown) in the reactor pressure vessel 11, and configured to forcefully feed cooling water into the reactor core 12.

As shown in FIGS. 2 and 3, a jet pump 18 includes a riser 20 serving as a cooling water supply pipe, a transition piece 21, an inlet mixer 22 constituting a pair of elbow parts, and diffusers 23. The transition piece 21 is integrally configured with an upper portion of the riser 20 to form a bifurcated branch portion at the top of the riser.

As shown in FIGS. 3 and 4, transition piece posts 25, 25 are fixed to both sides of the bifurcated branch portion of the transition piece 21 so as to be opposed to each other and erected vertically upward. The pair of transition piece posts 25, 25 have pockets 26, 26 of engaging groove shape in their mutually-opposed inner surface sides. Both ends of jet pump beams 27, or plate spring members, made of a nickel-base alloy are inserted into and supported by the pockets 26, 26, whereby the jet pump beams 27 are laid across in a generally horizontal direction.

The jet pump beams 27 are in contact with and support the top of the inlet mixer 22 forming the elbow parts so that the top of the inlet mixer 22 is pressed from above. The inlet mixer 22 is installed on a seal surface of the bifurcated portion of the transition piece 21 to form reversing channels of cooling water that rises through the riser 20.

Both ends of the jet pump beams 27 are in surface contact with, engaged with, and supported by upper surfaces of the pockets 26, 26. Protrusions 28 with through-holes for having are formed on the inlet mixer 22.

A vertical screw hole 29 (shown in FIG. 6) orthogonal to a beam axis direction is formed in the center of each jet pump beam 27. A male screw 31 of a head bolt made of a polygonal bolt such as a hex bolt is threadedly coupled with the vertical screw hole 29. An extremity (lower end) of the male screw 31 makes contact with and supports the top of the inlet mixer 22 so as to press the top. A predetermined axial force is thus applied to a head bolt 30 so that the inlet mixer 22 is fixed to the riser 20 by resilience of the jet pump beam 27 which is a plate spring member.

The inlet mixer 22 is detachably installed onto the transition piece 21 at the top of the riser 20 by using bolt fixing devices 35 of the jet pump beams 27.

Figure 5:
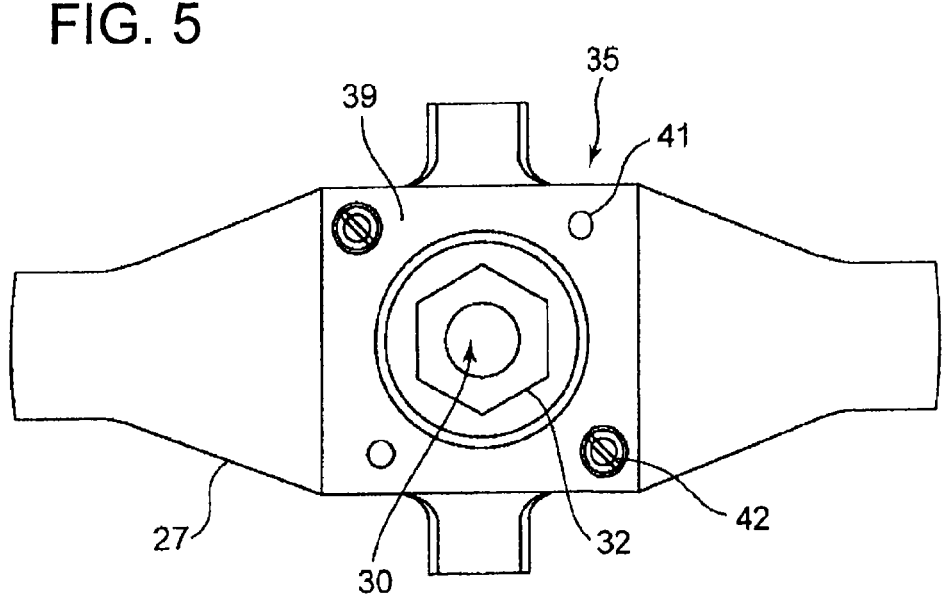
FIG. 5 is a plan view showing a first embodiment of the bolt fixing device of a jet pump beam according to the present invention.
Figure 6:
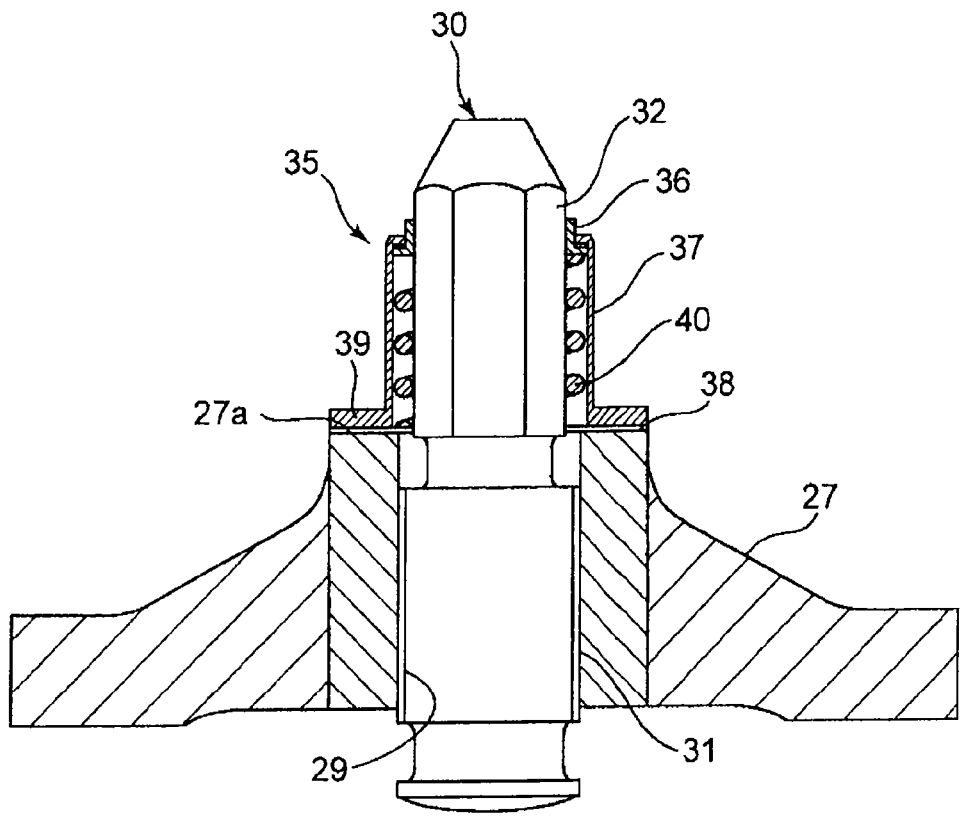
FIG. 6 is an elevational sectional view showing the bolt fixing device of FIG. 5.

Next, the bolt fixing device 35 of the jet pump beams 27 according to the present embodiment will be described. FIG. 5 is a plan view showing a first embodiment of the bolt fixing device of a jet pump beam according to the present invention. FIG. 6 is a sectional elevational view showing the bolt fixing device of FIG. 5.

As shown in FIGS. 5 and 6, a bolt fixing device 35 includes a head bolt 30 which is threadedly coupled with a vertical screw hole 29 of a jet pump beam 27, a lock cap 36 serving as a moving member which is capable of integral rotation with a polygonal head portion 32 of the head bolt 30 and is axially movable up and down, a body housing 37 which can accommodate the lock cap 36 in a fixing position or a rotatable position selectively, and a spring member 40 serving as an elastic member which is accommodated in the body housing 37 and applies elastic force to the lock cap 36 toward an integral rotation side above.

In other words, the lock cap 36 is fitted to and combined with the head bolt 30 which fixes the inlet mixer 22 to the riser 20, and is arranged inside the body housing 37.

The body housing 37 includes an integrally-formed base plate 39 which is intended for installation onto the top (upper surface) 27a of the jet pump beam 27 via a washer 38. The base plate 39 is fixed to the top 27a of the jet pump beam 27 by positioning pins 41 and machine screws 42 such as flat head screws.

Next, the configuration of the body housing 37 will be described in detail.

Figure 7:
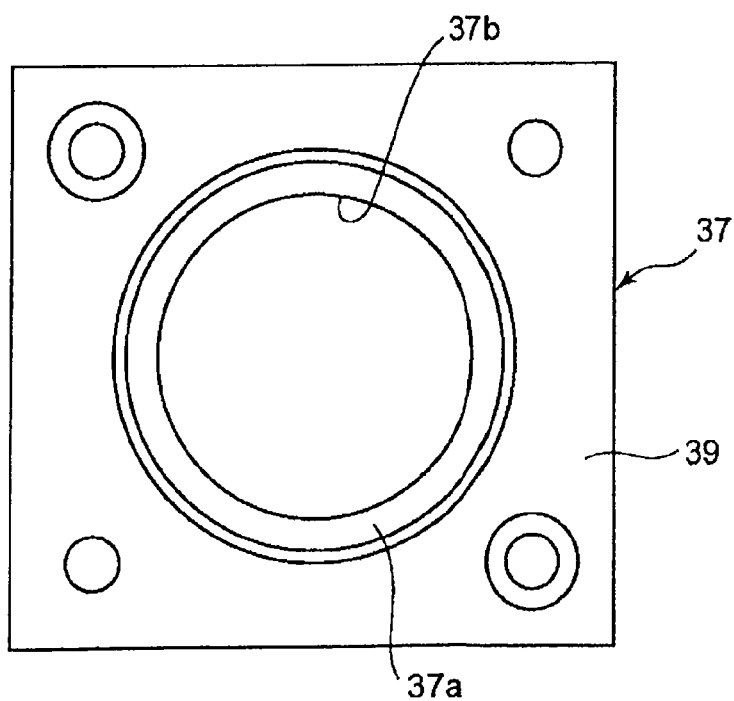
FIG. 7 is a plan view showing a body housing of FIG. 6.
Figure 8:
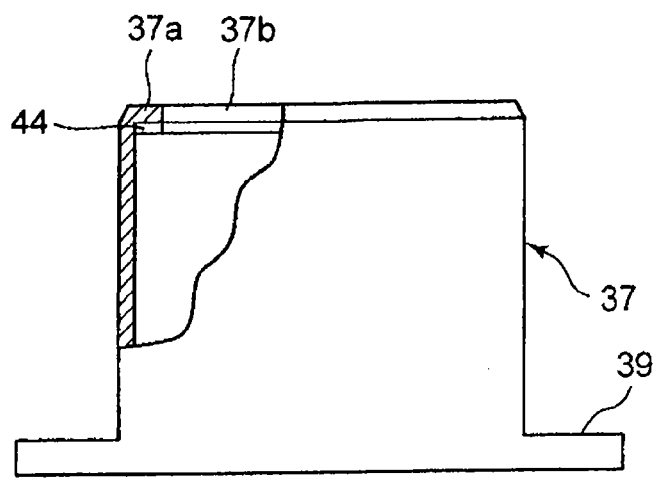
FIG. 8 is a partially sectional elevational view showing the body housing of FIG. 6.
Figure 9:
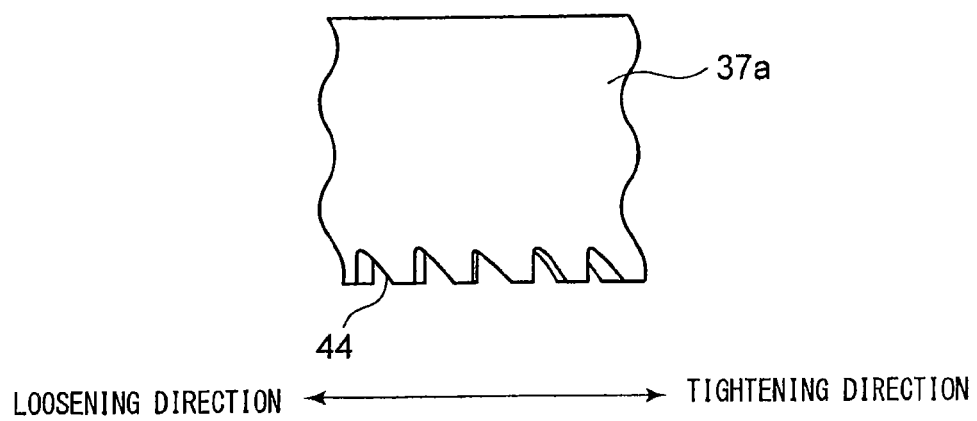
FIG. 9 is an enlarged side view showing lower surface teeth of FIG. 8.
Figure 10:
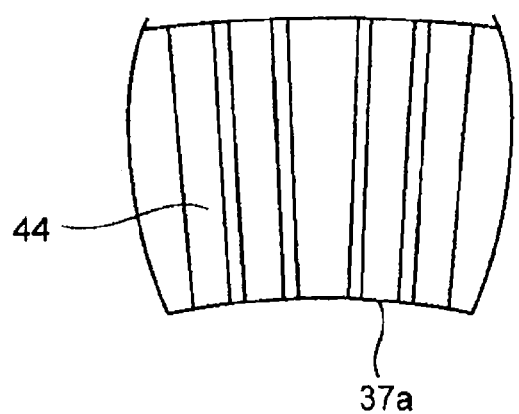
FIG. 10 is an enlarged bottom view showing the lower surface teeth of FIG. 8.

FIG. 7 is a plan view showing the body housing of FIG. 6. FIG. 8 is a partially sectional elevational view showing the body housing of FIG. 6. FIG. 9 is an enlarged side view showing lower surface teeth of FIG. 8. FIG. 10 is an enlarged bottom view showing the lower surface teeth of FIG. 8.

As shown in FIGS. 7 and 8, a locking flange 37a is integrally formed on an inner peripheral side of the upper surface of the body housing 37. A plurality of downward, inclined lower surface teeth 44 as shown in FIGS. 9 and 10 are circumferentially formed on the lower surface of the locking flange 37a.

As shown in FIGS. 7 and 8, a circular opening 37b is formed in the upper surface of the body housing 37. A sleeve portion 36c (shown in FIG. 12) of the lock cap 36 is arranged on the inner peripheral side of the opening 37b. Since the flange portion 36a of the lock cap 36 and the spring member 40 are arranged inside the body housing 37, the height dimension of the body housing 37 is determined in consideration of the heights of the flange portion 36a and the spring member 40.

The body housing 37 has an outer diameter capable of handling by a not-shown handling device. Torque due to loosening of the bolt causes torsional stress on the barrel portion of the body housing 37. The barrel portion of the body housing 37 thus has a thickness satisfying allowable stress.

As shown in FIGS. 9 and 10, the lower surface teeth 44 of the body housing 37 are formed in a serrated shape. Specifically, a lower surface tooth 44 includes a vertical surface that extends vertically downward with respect to the direction of rotation of the head bolt 30 when the head bolt 30 loosens (hereinafter, referred to as the loosening direction of the head bolt 30) and an inclined surface that is inclined with respect to the direction of rotation of the head bolt 30 when the head bolt 30 tightens (hereinafter, referred to as the tightening direction of the head bolt 30), the vertical and inclined surfaces being formed with a horizontal surface therebetween. A plurality of such lower surface teeth 44 are formed along the circumferential direction.

Next, the configuration of the lock cap 36 will be described in detail.

Figure 11:
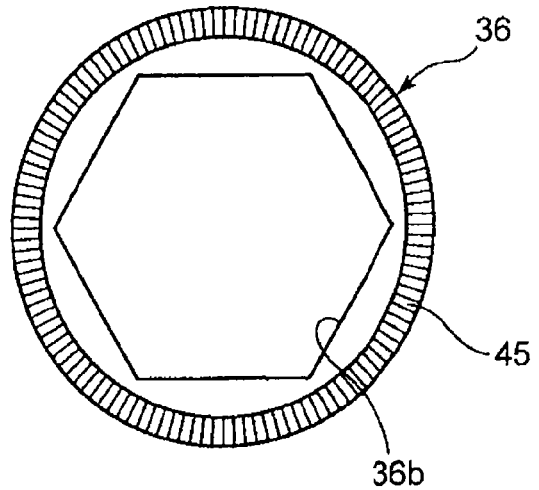
FIG. 11 is a plan view showing a lock cap of FIG. 6.
Figure 12:
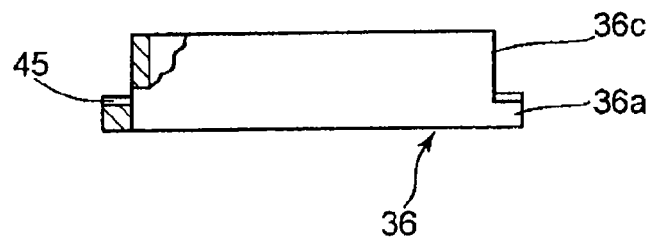
FIG. 12 is a partially sectional elevational view showing the lock cap of FIG. 6.
Figure 13:
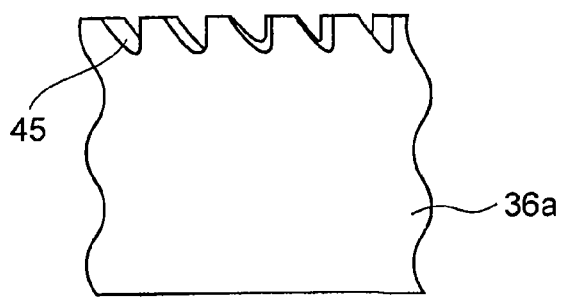
FIG. 13 is an enlarged side view showing upper surface teeth of FIG. 12.
Figure 14:
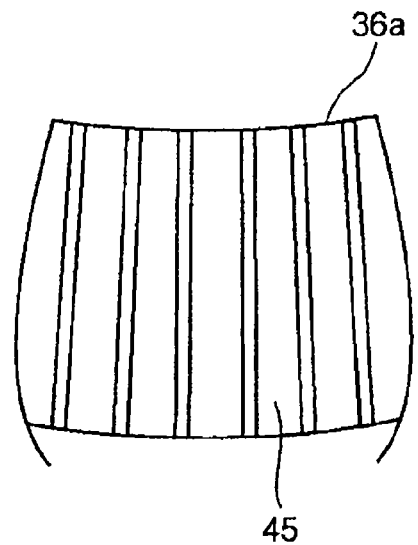
FIG. 14 is an enlarged plan view showing the upper surface teeth of FIG. 12.

FIG. 11 is a plan view showing the lock cap of FIG. 6. FIG. 12 is a partially sectional elevational view showing the lock cap of FIG. 6. FIG. 13 is an enlarged side view showing upper surface teeth of FIG. 12. FIG. 14 is an enlarged plan view showing the upper surface teeth of FIG. 12.

As shown in FIGS. 11 and 12, a hole 36b having a hexagonal shape similar to the outer shape of the head bolt 30 is formed in the inner peripheral side of the lock cap 36. The head bolt 30 having a hexagonal outer peripheral surface is fitted to the hexagonal hole 36b of the lock cap 36. When the lock cap 36 is combined with the body housing 37, the sleeve portion 36c of the lock cap 36 is positioned inside the body housing 37.

The flange portion 36a extending radially outward as described above is integrally formed on the lock cap 36. A plurality of inclined upper surface teeth 45 to mesh with the lower surface teeth 44 of the body housing 37 are circumferentially formed on the upper surface of the flange portion 36a. When the lock cap 36 is pushed up by the elastic force of the spring member 40, the lower surface teeth 44 of the body housing 37 and the upper surface teeth 45 of the lock cap 36 do mesh with each other to fix the head bolt 30, whereby the head bolt 30 can be locked against rotation.

As shown in FIGS. 13 and 14, the upper surface teeth 45 of the body housing 37 are formed in a serrated shape like the lower surface teeth 44. Specifically, like the lower surface teeth 44, an upper surface tooth 45 includes a vertical surface that extends vertically upward with respect to the loosening direction of the head bolt 30 and an inclined surface that is inclined with respect to the tightening direction of the head bolt 30, the vertical and inclined surfaces being formed with a horizontal surface therebetween. A plurality of such upper surface teeth 45 are formed along the circumferential direction. In other words, the upper surface teeth 45 of the lock cap 36 and the lower surface teeth 44 of the body housing 37 are formed in serrated shapes and include vertical surfaces extending vertically that face each other in contact with each other when the head bolt 30 is rotated to be loosened.

The sleeve portion 36c is configured to protrude vertically upward from the locking flange 37a of the body housing 37 when the lock cap 36 is pushed up by the elastic force of the spring member 40.

If, for example, an operator on an operation floor pushes down the protruding sleeve portion 36c to push down the spring member 40 against its elastic force by using a tool such as a not-shown hex wrench, the lock cap 36 slides vertically downward. This unmeshes and unlocks the upper surface teeth 45 of the lock cap 36 from the lower surface teeth 44 of the body housing 37. As a result, the lock cap 36 co-rotating with the head bolt 30 is unlocked, and the head bolt 30 becomes rotatable without meshing with the lower surface teeth 44 of the body housing 37.

The lock cap 36 and the body housing 37 are made of hard material such as a nickel-based alloy. At least the lower surface teeth 44 of the body housing 37 and the upper surface teeth 45 of the lock cap 36 are made of hard material.

Since the spring member 40 is arranged between the outer periphery of the head bolt 30 and the inner periphery of the body housing 37, the average diameter and wire diameter of the spring member 40 are determined within the range of the limited space. The height of the body housing 37 is determined so that the spring member 40 has a height greater than or equal to its solid height when the lock cap 36 is pushed down. If elastic force needed to push up the lock cap 36 cannot be obtained, the body housing 37 is formed higher and the head bolt 30 longer to set dimensions at which the necessary elastic force of the spring member 40 can be obtained.

An upper end of the spring member 40 is in contact with the bottom surface of the flange portion 36a of the lock cap 36. A lower end of the spring member 40 is supported by the upper surface of the washer 38. Since the lower end of the spring member 40 is supported by the washer 38, the spring member 40 is prevented from falling into the screw hole 29 of the jet pump beam 27. As a result, the spring member 40 can reliably push up the lock cap 36 by its elastic force.

(Operation)

Next, an operation of the present embodiment will be described.

Figure 15:
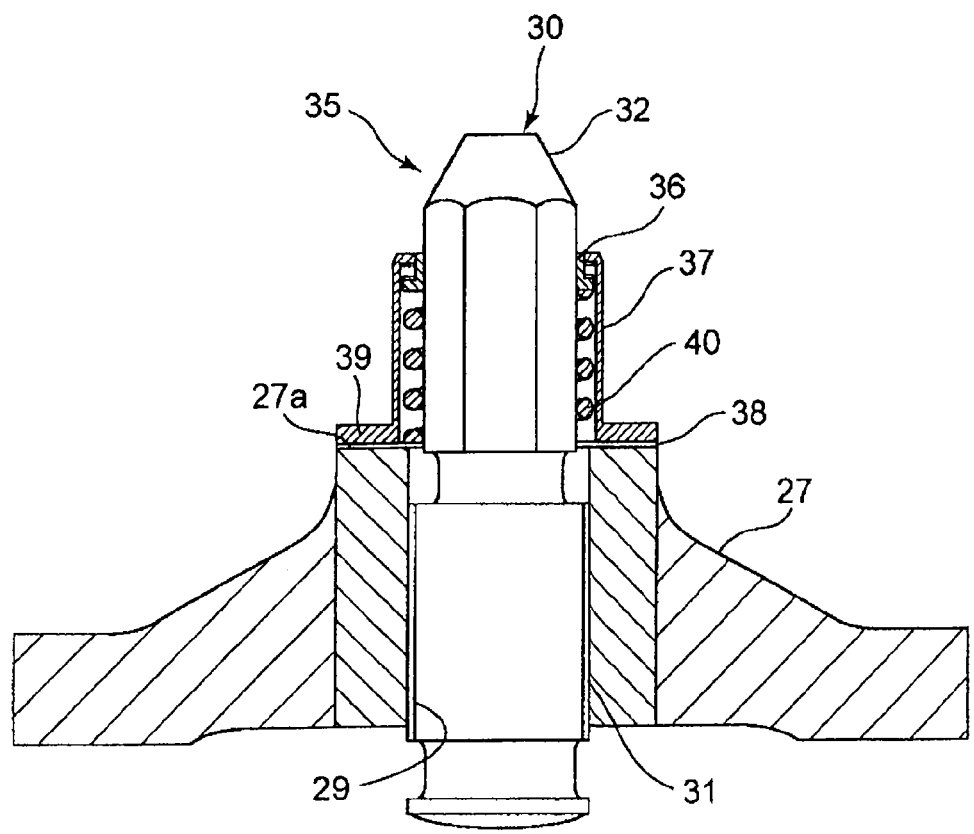

FIG. 15 is an elevational sectional view showing a state where the lock cap of FIG. 6 is pushed in. FIGS. 16(a), 16(b), 16(c), and 16(d) are enlarged views showing the order of meshing of the upper surface teeth and the lower surface teeth according to the first embodiment.

FIG. 15 shows a state where, for example, an operator on an operation floor pushes in the sleeve portion 36c of the lock cap 36 protruding vertically upward from the upper surface of the body housing 37 by using a tool such as a not-shown hex wrench.

As shown in FIG. 15, the dimension from the upper surface of the body housing 37 to the position of the polygonal head portion 32 where the six sides of the head bolt 30 are formed constitutes a grip portion for applying tightening torque to the head bolt 30. Dimensions enough to apply torque shall be secured.

Figure 16:
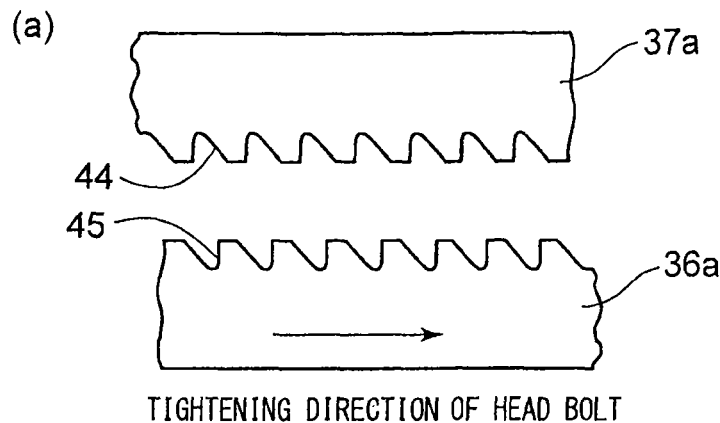
FIGS. 16(a), 16(b), 16(c), and 16(d) are enlarged views showing the order of meshing of the upper surface teeth and the lower surface teeth according to the first embodiment.
Figure 16:
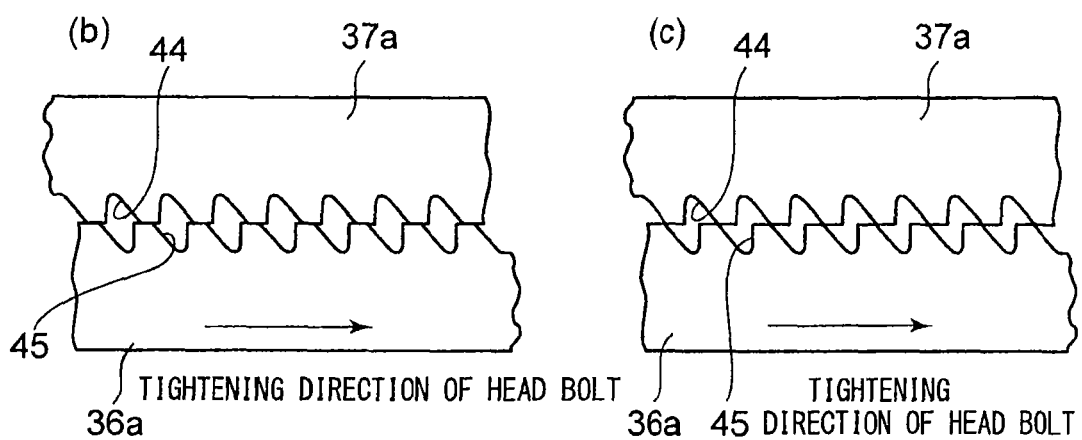
Figure 16:
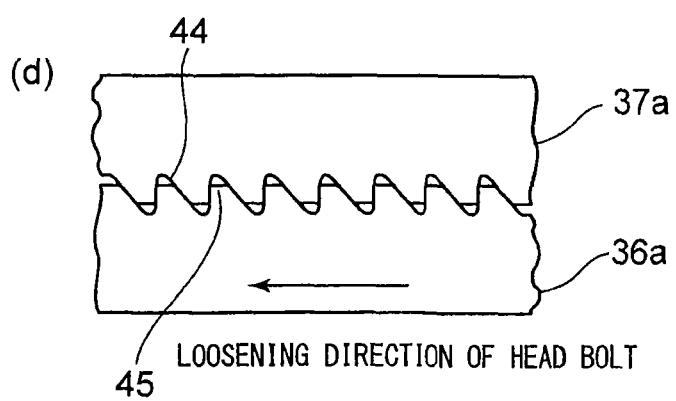

When tightening the head bolt 30, the operator starts to tighten the head bolt 30 by using a tool such as a not-shown hex wrench in the state shown in FIG. 15. The lock cap 36 usually co-rotates with the head bolt 30. When the sleeve portion 36c of the lock cap 36 is pushed in, as shown in FIG. 16(a), the head bolt 30 can rotate without the lower surface teeth 44 of the body housing 37 and the upper surface teeth 45 of the lock cap 36 interfering with each other.

After the start of the tightening of the head bolt 30, the pressing force on the sleeve portion 36c of the lock cap 36 is removed (released) when certain torque occurs. When the pressing force on the sleeve portion 36c of the lock cap 36 is removed, the lock cap 36 is pushed vertically upward by the elastic force of the spring member 40 to a position where the upper surface teeth 45 of the lock cap 36 are in contact with the lower surface teeth 44 of the body housing 37. Here, the lower surface teeth 44 and the upper surface teeth 45 make contact with each other in different states in the positional relationship of FIG. 16(b) or 16(c), depending on the point in time when the sleeve portion 36c of the lock cap 36 is released.

After the pressing force on the sleeve portion 36c of the lock cap 36 is removed, the tightening of the head bolt 30 is started again. The head bolt 30 is tightened until prescribed torque is obtained. Here, the states of FIGS. 16(b) and 16(c) are repeated to reach the prescribed torque.

After the tightening of the head bolt 30, the operator cannot get the positional relationship between the lower surface teeth 44 of the body housing 37 and the upper surface teeth 45 of the lock cap 36. The operator thus ends the tightening in a state where the head bolt 30 is tightened with the needed torque, which is shown in FIG. 16(b) or 16(c). The lower surface teeth 44 of the body housing 37 and the upper surface teeth 45 of the lock cap 36 do not always mesh completely with each other.

However, if the head bolt 30 undergoes loosening torque, the lock cap 36 co-rotates with the head bolt 30 to start rotating in the loosening direction. As the rotation continues, the lower surface teeth 44 of the body housing 37 and the upper surface teeth 45 of the lock cap 36 come into the completely-meshing positional relationship of FIG. 16(d).

Assuming that the foregoing prescribed torque is the maximum tightening force of the jet pump beam 27, the tightening force of the jet pump beam 27 loosens from the maximum tightening force to the position where the teeth mesh with each other. To obtain a minimum tightening torque in such a state, the maximum amount of loosening needs to be within a tolerance range of the tightening force. The maximum amount of loosening is the tooth pitch. The tooth pitch is thus determined by converting the tolerance range of the tightening force of the head bolt 30 into an allowable rotation angle of the head bolt 30.

In such a manner, according to the present embodiment, the head bolt 30 can be easily and reliably locked against rotation when dismounting the inlet mixer 22 from the jet pump 18 or when reinstalling the inlet mixer 22 on the jet pump 18.

The head bolt 30 can be easily and reliably fixed to the jet pump beam 27 by meshing the upper surface teeth 45 of the lock cap 36 with the lower surface teeth 44 of the body housing 37. Incidentally, since the upper surface teeth 45 and the lower surface teeth 44 can be easily and reliably meshed with each other, the upper surface teeth 45 and the lower surface teeth 44 do not need precision machining. This can increase the machining efficiency.

To unfix the head bolt 30, the lock cap 36 can be simply pushed down against the elastic force of the spring member 40 to unmesh the upper surface teeth 45 of the lock cap 36 from the lower surface teeth 44 of the body housing 37. The lock cap 36 can thus be simply and easily made rotatable with respect to the body housing 37. The head bolt 30 can be easily and reliably fixed and unfixed by operating the lock cap 36 to slide in the axial direction of the head bolt 30.

In such a manner, according to the bolt fixing device 35 of the jet pump beam 27 of the present embodiment, the inlet mixer 22 is installed on the seat surface of the transition piece 21 on the upper portion of the riser 20 of the jet pump 18 as pressed and supported by the bolt fixing device 35 by utilizing the jet pump beam 27.

(Effect)

According to the bolt fixing device 35 of the present embodiment, mechanical rotation locking is provided when installing the inlet mixer 22 of the cooling water circulation jet pump 18 which is arranged in the downcomer portion 17 of the boiling water reactor 10. The head bolt 30 of the jet pump beam 27 thereby can be easily and accurately locked against rotation, and can be easily unlocked as well.

According to the present embodiment, when reinstalling the inlet mixer 22, the inlet mixer 22 can be easily dismounted and reinstalled in a short time. The head bolt 30 can be rotated without the teeth interfering with each other, which can reduce the wear of the teeth.

Moreover, according to the present embodiment, the upper surface teeth 45 of the lock cap 36 and the lower surface teeth 44 of the body housing 37 are formed in a serrated shape, including vertical surfaces that extend vertically with respect to the loosening direction of the head bolt 30. This prevents the occurrence of a vertically downward force component on the spring member 40 due to the loosening torque of the head bolt 30.

Consequently, according to the present embodiment, the upper surface teeth 45 of the lock cap 36 and the lower surface teeth 44 of the body housing 37 are prevented from accidental unmeshing. The vertical force of the spring member 40 always acts upward, which can improve the reliability as a bolt fixing device.

Second Embodiment

Figure 17:
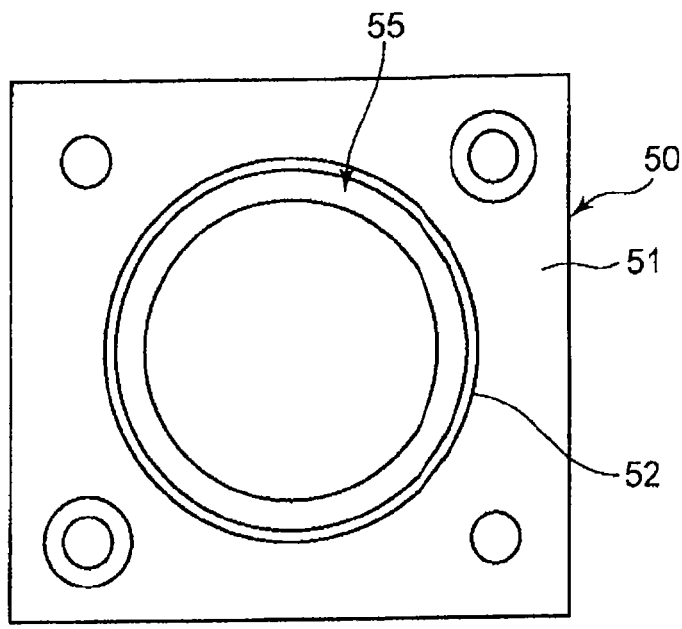
FIG. 17 is a plan view showing a body housing in a second embodiment of the bolt fixing device of a jet pump beam according to the present invention.
Figure 18:
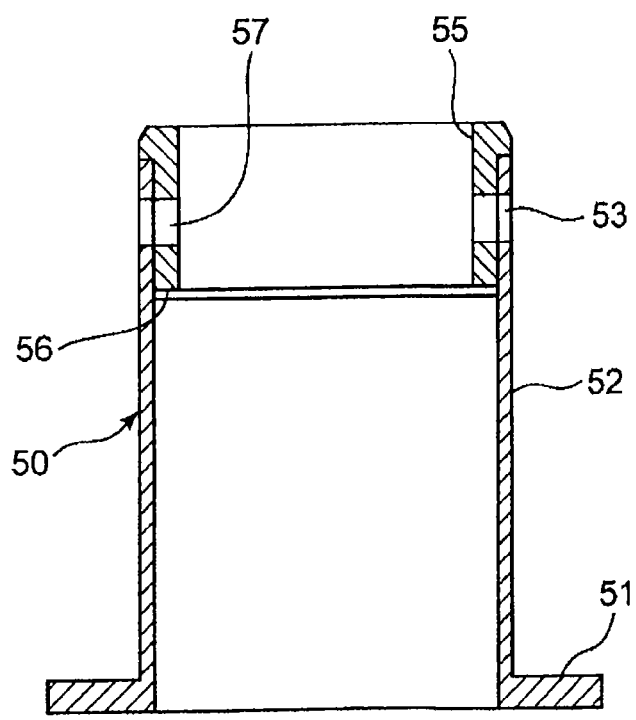
FIG. 18 is an elevational sectional view of FIG. 17.
Figure 19:
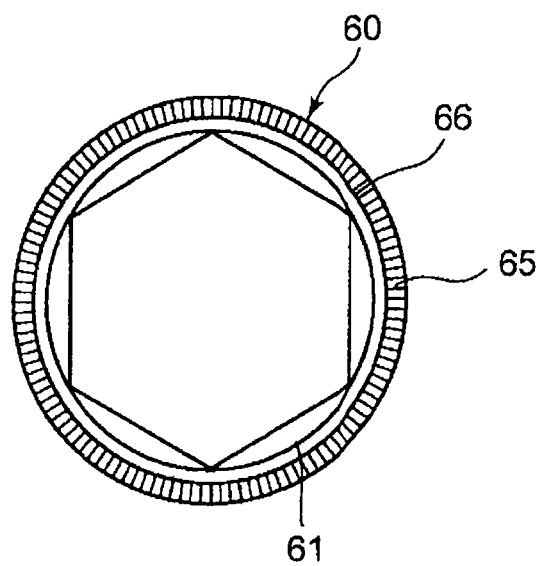
FIG. 19 is a plan view showing a lock cap in the second embodiment of the bolt fixing device of a jet pump beam according to the present invention.
Figure 20:
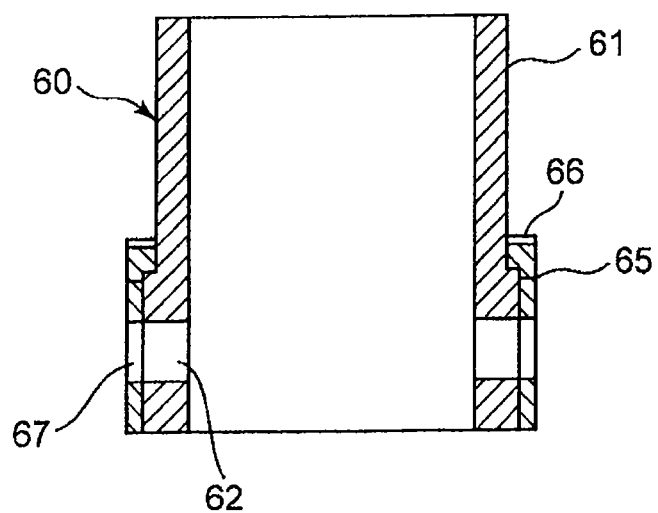
FIG. 20 is an elevational sectional view of FIG. 19.

FIG. 17 is a plan view showing a body housing in a second embodiment of the bolt fixing device of a jet pump beam according to the present invention. FIG. 18 is an elevational sectional view of FIG. 17. FIG. 19 is a plan view showing a lock cap in the second embodiment of the bolt fixing device of a jet pump beam according to the present invention. FIG. 20 is an elevational sectional view of FIG. 19.

In the following embodiment, a configuration, operation, and effects different from those of the foregoing first embodiment will be described. A redundant description is omitted. The same applies to the other embodiments.

In the foregoing first embodiment, the body housing 37 and the lock cap 36 both have an integral structure, including a complicated tooth structure each. In the present embodiment, a body housing 50 and a lock cap 60 have a divided structure for improved tooth machinability.

As shown in FIGS. 17 and 18, the body housing 50 is divided between a housing 52 on which a flange 51 is integrally formed and a tooth forming unit 55 which has lower surface teeth 56 formed on its lower end. A plurality of fixing holes 53 are formed in the housing 52.

The lower surface teeth 56 are formed on the lower end of the tooth forming unit 55. The tooth forming unit 55 also has fixing holes 57 which are formed in portions that come to the same positions as the fixing holes 53 when the tooth forming unit 55 is combined with the housing 52.

The housing 52 and the tooth forming unit 55 are coupled with each other by inserting fixing members such as a not-shown pin into the fixing holes 53 of the housing 52 and the fixing holes 53 of the tooth forming unit 55.

Since the body housing 50 is configured to be divided between the housing 52 and the tooth forming unit 55, the lower surface teeth 56 can be machined with a relief.

As shown in FIGS. 19 and 20, the lock cap 60 is divided between a cap body 61 and a tooth forming unit 65. A plurality of fixing holes 62 are formed in the cap body 61.

Upper surface teeth 66 are formed on the upper end of the tooth forming unit 65. The tooth forming unit 65 also has fixing holes 67 which are formed in portions that come to the same positions as the fixing holes 62 when the tooth forming unit 65 is combined with the cap body 61.

The cap body 61 and the tooth forming unit 65 are coupled with each other by inserting fixing members such as a not-shown pin into the fixing holes 62 of the cap body 61 and the fixing holes 67 of the tooth forming unit 55.

Since the lock cap 60 is configured to be divided between the cap body 61 and the tooth forming unit 65, the upper surface teeth 66 can be machined with a relief.

In the present embodiment, the body housing 50 and the lock cap 60 each have a divided structure, which increases the height dimensions. The height dimension of the head bolt 30 is thus desirably increased to secure dimensions for applying torque because the portion from the upper surface of the body housing 50 to the position where the polygonal head portion 32 of the head bolt 30 is formed serves as the grip portion for applying tightening torque.

As described above, according to the present embodiment, the body housing 50 and the lock cap 60 include the tooth forming units 55 and 65 of divided structure, respectively. This can improve the machinability of the body housing 50 and the lock cap 60.

Third Embodiment

Figure 21:
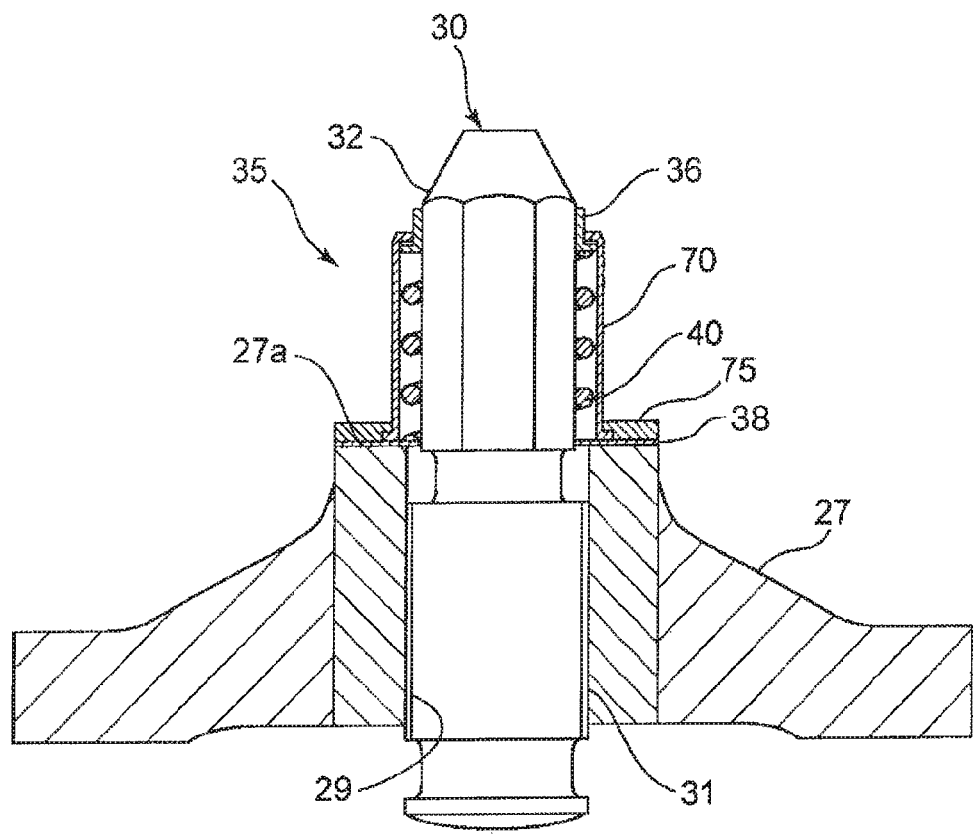
FIG. 21 is an elevational sectional view showing a third embodiment of the bolt fixing device of a jet pump beam according to the present invention.

FIG. 21 is an elevational sectional view showing a third embodiment of the bolt fixing device of a jet pump beam according to the present invention.

In the foregoing first embodiment, the base plate 39 of the body housing 37 is fixed to the jet pump beam 27 by the positioning pins 41 and the machine screws 42.

As shown in FIG. 21, the present embodiment includes a base plate 75. A body housing 70 is fixed to the base plate 75. The base plate 75 is fixed to the jet pump beam 27 by the positioning pins 41 and the machine screws 42.

Next, the configuration of the body housing 70 will be described in detail.

Figure 22:
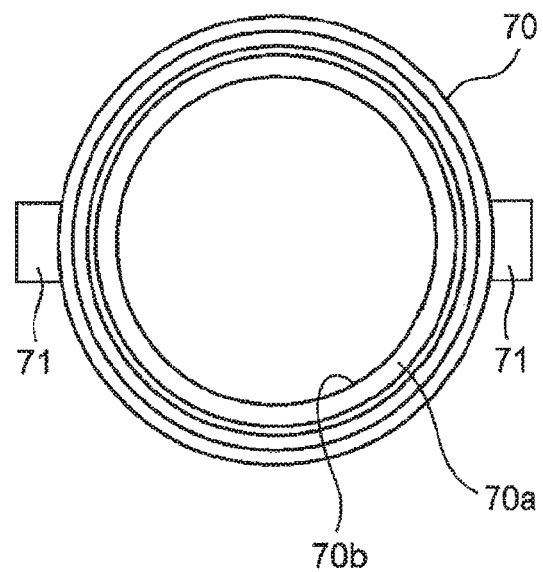
FIG. 22 is a plan view showing a body housing of FIG. 21.
Figure 23:
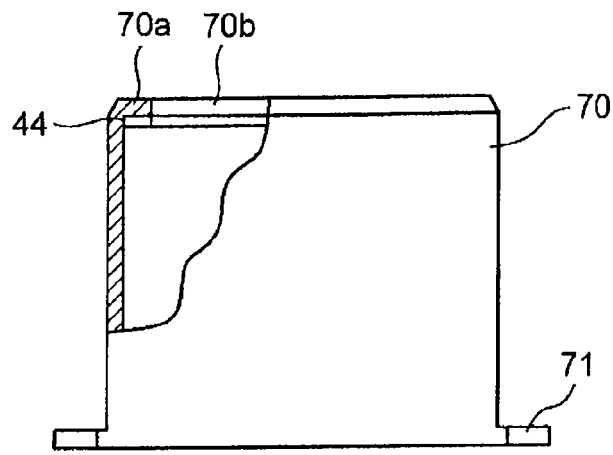
FIG. 23 is a partially sectional elevational view showing the body housing of FIG. 21.

FIG. 22 is a plan view showing the body housing of FIG. 21. FIG. 23 is a partially sectional elevational view showing the body housing of FIG. 21.

As shown in FIGS. 22 and 23, a locking flange 70a is integrally formed on the inner peripheral side of the upper surface of the body housing 70. A plurality of downward, inclined lower surface teeth 44 are circumferentially formed on the lower surface of the locking flange 70a.

As shown in FIGS. 22 and 23, a circular opening 70b is formed in the upper surface of the body housing 70. The lock cap 36 is arranged inside the opening 70b. Tabs 71 extending radially outward are formed on the body housing 70 in circumferentially opposite positions.

Next, the configuration of the base plate 75 will be described in detail.

Figure 24:
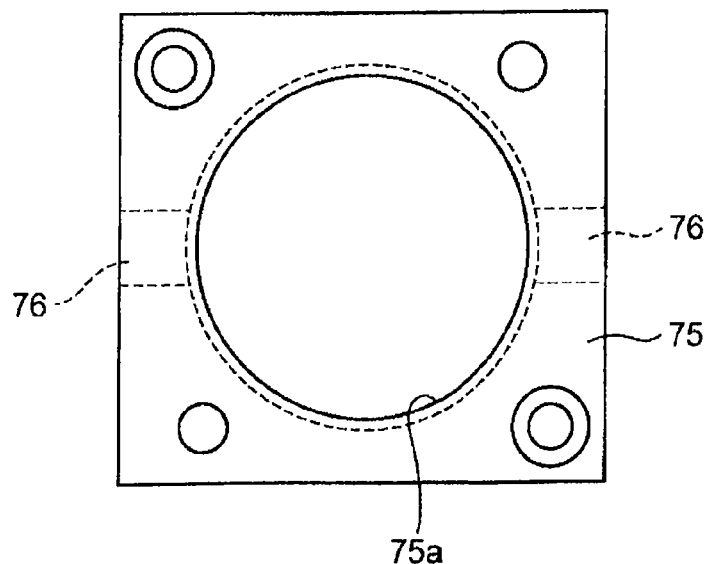
FIG. 24 is a plan view showing a base plate of FIG. 21.
Figure 25:
FIG. 25 is a partially sectional elevational view showing the base plate of FIG. 21.

FIG. 24 is a plan view showing the base plate of FIG. 21. FIG. 25 is a partially sectional elevational view showing the base plate of FIG. 21.

As shown in FIGS. 24 and 25, a circular stepped hole 75a having upper and lower, two stages of diameters is formed in the center of the base plate 75. Notches 76 are formed in the underside of the base plate 75 in the same circumferential positions as those of the tabs 71 of the body housing 70.

Consequently, in the present embodiment, the lower surface of the upper stage of the stepped hole 75a in the base plate 75 holds down a tapered portion in a lower part of the body housing 70, whereby the force of the spring member 40 acting vertically upward is prevented from lifting.

The tabs 71 formed on the lower part of the body housing 70 fit to the notches 76 in the base plate 75. This prevents force acting in the direction of rotation due to the loosening torque of the head bolt 30.

In the present embodiment, the tabs 71 of the body housing 70 and the notches 76 in the base plate 75 may have a difference in width, without the tabs 71 fitting to the notches 76. The difference is set to allow circumferential rotation of the body housing 70. In other words, the amount of the difference between the widths can be adjusted to arbitrarily adjust the amount of rotation of the body housing 70 in the circumferential direction.

The foregoing first embodiment is configured so that the positional relationship between the lower surface teeth 44 of the body housing 37 and the upper surface teeth 45 of the lock cap 36 cannot be adjusted after the tightening of the head bolt 30. The teeth mesh with each other when loosening torque occurs.

In contrast, the present embodiment allows rotation of the body housing 70. The tightening of the head bolt 30 can thus be completed with the lower surface teeth 44 of the body housing 70 and the upper surface teeth 45 of the lock cap 36 fully meshed with each other.

Fourth Embodiment

Figure 26:
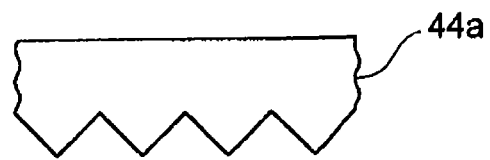
FIG. 26 is an enlarged view showing upper surface teeth and lower surface teeth in a fourth embodiment of the bolt fixing device of a jet pump beam according to the present invention.
Figure 26:
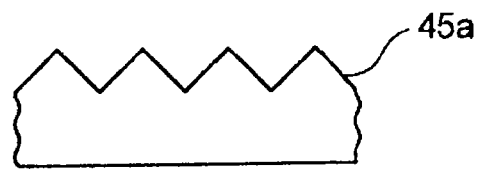

FIG. 26 is an enlarged view showing upper surface teeth and lower surface teeth in a fourth embodiment of the bolt fixing device of a jet pump beam according to the present invention.

In the foregoing first embodiment, the lower surface teeth 44 of the body housing 37 and the upper surface teeth 45 of the lock cap 36 are formed in a serrated shape.

In the present embodiment, as shown in FIG. 26, the lower surface teeth 44a of the body housing 37 and the upper surface teeth 45a of the lock cap 36 are formed in a triangular shape having equal angles of inclination.

In other words, according to the present embodiment, the lower surface teeth 44a and the upper surface teeth 45a have inclined surfaces that are inclined both in the tightening direction and the loosening direction. The upper surface teeth 45a of the lock cap 36 and the lower surface teeth 44a of the body housing 37 include forwardly inclined surfaces that face each other in contact with each other when the head bolt 30 is rotated to be loosened and when the head bolt 30 is rotated to be tightened.

In the present embodiment, the inclined surfaces in the loosening direction of the head bolt 30 produce vertically downward force when loosening torque occurs. Loosening can be prevented by increasing the elastic force of the spring member 40.

According to the present embodiment, the lower surface teeth 44a and the upper surface teeth 45a have the inclined surfaces inclined both in the tightening direction of the head bolt 30 and the loosening direction of the head bolt 30. A rotational load can be applied to force rotation in the tightening direction and the loosening direction even in a meshing state.

Fifth Embodiment

Figure 27:
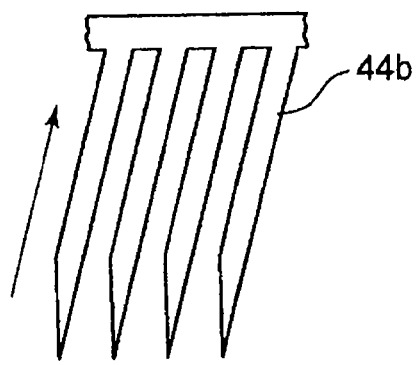
FIG. 27 is an enlarged view showing upper surface teeth and lower surface teeth in a fifth embodiment of the bolt fixing device of a jet pump beam according to the present invention.
Figure 27:
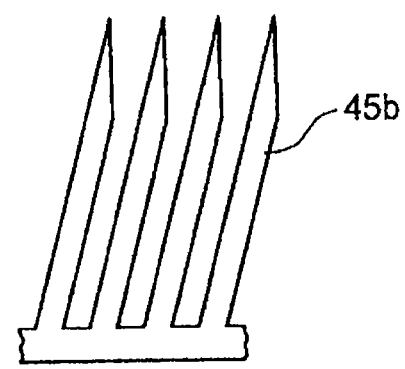

FIG. 27 is an enlarged view showing upper surface teeth and lower surface teeth in a fifth embodiment of the bolt fixing device of a jet pump beam according to the present invention.

As shown in FIG. 27, in the present embodiment, the lower surface teeth 44b of the body housing 37 and the upper surface teeth 45b of the lock cap 36 are formed in parallel with each other and so as to be inclined in the tightening direction of the head bolt 30.

In the present embodiment, the pitches of the lower surface teeth 44b and the upper surface teeth 45b determine the tolerance of the tightening force. Even if loosening occurs as much as a pitch of the lower surface teeth 44b and the upper surface teeth 45b, turning force is applied in the tightening direction in the process of being pushed up by the elastic force of the spring member 40.

As described above, according to the present embodiment, the lower surface teeth 44b and the upper surface teeth 45b are formed in parallel with each other and inclined in the tightening direction of the head bolt 30. Even if loosening occurs as much as a tooth pitch, the amount of loosening can be reduced by the application of the turning force in the tightening direction.

The embodiments of the present invention have been described above. Such embodiments have been presented by way of example and not intended to limit the scope of the invention. The new embodiments may be practiced in various other forms, and various omissions, substitutions, and modifications may be made without departing from the gist of the invention. Such embodiments and modifications are covered by the scope and gist of the invention, and embraced in the inventions set forth in the claims and the range of equivalency thereof.

For example, the foregoing embodiments have dealt with the cases where a compression spring is used as the spring member 40. However, this is not restrictive. A leaf spring, rubber, and other elastic members may be used.

In the foregoing embodiments, a plurality of upper surface teeth 45, 45a, 45b, or 66 are formed on the upper surface of the flange portion 36a, or the tooth forming unit 65 of the lock cap 36, 60 a plurality of lower surface teeth 44, 44a, 44b, or 56 are formed on the lower surface of the locking flange 37a 70a or tooth forming unit 55 of the body housing 37, 70 50 and the teeth are meshed with each other. However, this is not restrictive. A pin may be attached to the upper surface of the flange portion 36a of the lock cap 36 to form an engaging portion, and a hole serving as a to-be-engaged portion to be engaged with the pin may be formed in the lower surface of the locking flange 37a of the body housing 37. The engaging portion and the to-be-engaged portion may be such that the engaging portion is a hole and the to-be-engaged portion is a pin. The engaging portion and the to-be-engaged portion are not limited to a combination of a pin and a hole, and may have other shapes capable of fitting, such as a recess and a projection.

EXPLANATION OF THE SYMBOLS

10: boiling water reactor
11: reactor pressure vessel
12: reactor core
13: vapor-liquid separator
14: vapor dryer
16: core shroud
17: downcomer portion
18: jet pump
20: riser
21: transition piece
22: inlet mixer
23: diffuser
25: transition piece post
26: pocket
27: jet pump beam
27a: top
28: hanging bolt
29: vertical screw hole
30: head bolt
31: male screw of a head bolt
32: polygonal head portion
35: bolt fixing device
36: lock cap
36a: flange portion
36b: hexagonal hole
36c: sleeve portion
37: body housing
37a: locking flange
37b: opening
38: washer
39: base plate
40: spring member (elastic member)
41: positioning pin
42: machine screw
44: lower surface tooth
45: upper surface tooth
50: body housing 51: flange
52: housing
53: fixing hole
55: tooth forming unit
56: lower surface tooth
57: fixing hole
60: lock cap
61: cap body
62: fixing hole
65: tooth forming unit
66: upper surface tooth
67: fixing hole
70: body housing
70a: locking flange
70b: opening
71: tab
75: base plate
75a: stepped hole
76: notch

The invention claimed is:

1. A bolt fixing device of a jet pump beam for fixing a head bolt of a jet pump beam pressing an inlet mixer from vertically above, the inlet mixer being arranged on an upper portion of a riser of the jet pump of a boiling water reactor and forming a reversing channel of cooling water, the bolt fixing device comprising:

a lock cap that fits to a polygonal head portion of the head bolt, is movable in a vertical axis direction, and is integrally rotatable with the head bolt;

a body housing that accommodates the lock cap and is arranged on an upper surface of the jet pump beam; and an elastic member that is arranged in the body housing below the lock cap and applies vertically upward elastic force to the lock cap, the lock cap being pushed up by the elastic force of the elastic member so that a plurality of upper surface teeth circumferentially formed on an upper surface of a flange of the lock cap mesh with a plurality of lower surface teeth circumferentially formed on a lower surface of a locking flange of the body housing, whereby the head bolt of the jet pump beam is fixed, wherein the upper surface teeth of the lock cap and the lower surface teeth of the body housing are formed in serrated shapes and include vertical surfaces extending vertically that face each other in contact with each other when the head bolt is rotated to be loosened, and include inclined surfaces that face each other in contact with each other when the head bolt is rotated to be tightened, and a pitch of the upper surface teeth of the lock cap and a pitch of the lower surface teeth of the body housing are determined by the maximum amount of rotation of the head bolt in the loosening direction whilst being in a tolerance range of the tightening force of the head bolt to ensure the upper surface teeth and lower surface teeth mesh.

2. The bolt fixing device of a jet pump beam according to claim 1, wherein the body housing is configured to be divided between a housing and a tooth forming unit, and formed by combining the housing and the tooth forming unit, the lower surface teeth being formed on the tooth forming unit.

3. The bolt fixing device of a jet pump beam according to claim 1, wherein the lock cap is configured to be divided between a cap body and a tooth forming unit, and formed by combining the cap body and the tooth forming unit, the upper surface teeth being formed on the tooth forming unit.

4. The bolt fixing device of a jet pump beam according to claim 1, further comprising a base plate fixable to the jet pump beam, wherein the body housing is circumferentially rotatably fixed to the base plate.

5. The bolt fixing device of a jet pump beam according to claim 1, wherein a sleeve portion of the lock cap protrudes vertically upward from the locking flange of the body housing when the upper surface teeth of the lock cap are in mesh with the lower surface teeth of the body housing.

6. A jet pump of a boiling water reactor including a bolt fixing device according to claim 1.

* * * * *